United States Patent
Fukui et al.

(10) Patent No.: US 7,764,292 B2
(45) Date of Patent: Jul. 27, 2010

(54) THREE DIMENSIONAL GRAPHICS PROCESSING APPARATUS, IMAGE DISPLAY APPARATUS, THREE DIMENSIONAL GRAPHICS PROCESSING METHOD, CONTROL PROGRAM AND COMPUTER-READABLE RECORDING MEDIUM

(75) Inventors: Hiroaki Fukui, Nara (JP); Isao Nakamura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 853 days.

(21) Appl. No.: 11/272,756

(22) Filed: Nov. 15, 2005

(65) Prior Publication Data

US 2006/0119614 A1    Jun. 8, 2006

(30) Foreign Application Priority Data

Nov. 15, 2004    (JP)    ............................. 2004-331224

(51) Int. Cl.
*G06T 15/00*    (2006.01)
(52) U.S. Cl. .................................................... 345/611
(58) Field of Classification Search ........................ None
See application file for complete search history.

(56) References Cited

U.S. PATENT DOCUMENTS

| | | | | |
|---|---|---|---|---|
| 5,278,949 A * | 1/1994 | Thayer | ....................... | 345/426 |
| 5,325,474 A * | 6/1994 | Kumazaki et al. | ........... | 345/611 |
| 6,774,897 B2 * | 8/2004 | Moriwaki | ................... | 345/427 |
| 6,982,723 B1 * | 1/2006 | Szymaniak | ................ | 345/611 |
| 7,142,224 B2 * | 11/2006 | Funakubo et al. | ........... | 345/611 |
| 7,280,121 B2 * | 10/2007 | Nakahashi et al. | .......... | 345/611 |
| 2005/0052455 A1 * | 3/2005 | Long et al. | ................... | 345/422 |

FOREIGN PATENT DOCUMENTS

| | | |
|---|---|---|
| JP | 6-4679 A | 1/1994 |
| JP | 8-315177 A | 11/1996 |
| JP | 2002-56395 A | 2/2002 |

OTHER PUBLICATIONS

Foley et al., "Computer Graphics: Principles and Practice," 1996, Addison Wesley, Second Edition, pp. 93-94.*

* cited by examiner

*Primary Examiner*—Ulka Chauhan
*Assistant Examiner*—Andrew Yang
(74) *Attorney, Agent, or Firm*—Birch, Stewart, Kolasch & Birch, LLP

(57) ABSTRACT

The present invention provides a three dimensional graphics processing apparatus for performing an anti-aliasing processing in an sufficient manner, without using the conventional area DDA, by using a line buffer as an area for storing display image data to reduce the required memory area, while the increase of the calculation time is restricted by performing calculation suitable for the polygon edge without degrading the precision of the calculation. In the three dimensional graphics processing apparatus, the coordinates of the intersection points between the polygon edge and the scanning lines are calculated from information on the starting vertex and the ending vertex of the polygon edge and information on the scanning lines. The calculation method is changed in accordance with the characteristics of the polygon edge. Further, a blending coefficient for the anti-aliasing process is obtained by calculating an area ratio of an internal region of the polygon occupied within a pixel.

16 Claims, 8 Drawing Sheets

Left edge          Right edge

THREE DIMENSIONAL GRAPHICS PROCESSING APPARATUS, IMAGE DISPLAY APPARATUS, THREE DIMENSIONAL GRAPHICS PROCESSING METHOD, CONTROL PROGRAM AND COMPUTER-READABLE RECORDING MEDIUM

This Nonprovisional application claims priority under 35 U.S.C. §119(a) on Patent Application No. 2004-331224 filed in Japan on Nov. 15, 2004, the entire contents of which are hereby incorporated by reference.

BACKGROUND OF THE INVENTION

1. Field of the Invention

The present invention relates to a three dimensional graphics processing apparatus capable of efficiently using a limited number of computing units and performing a highly consistent polygon edge drawing process and an anti-aliasing process at a higher speed without degrading the precision of the calculation, which can be used in a display unit for a gaming device capable of displaying computer graphics (CG). The present invention also relates to an image display apparatus including the three dimensional graphics processing apparatus, a three dimensional graphics processing method using the three dimensional graphics processing apparatus, a control program for making a computer execute the steps of the three dimensional graphics processing method, and a computer-readable recording medium on which the control program is recorded, for example.

2. Description of the Related Art

Conventionally, a filtering method is known as an anti-aliasing method (i.e. a method for processing jagged edges so that they are less noticeable) used in drawing a three dimensional graphic in the computer graphics (CG). This filtering method includes blending the color data of each drawing point with the color data of surrounding drawing points based on the weighted coefficients for each drawing point in the generated image data, and displaying result of this blending on a display screen.

This filtering method requires a small amount of calculation, although the quality is relatively low. This filtering method is also capable of independently obtaining blending results of drawing points on the respective scanning lines. As a result, the circuit configuration can be simplified compared to another drawing method which requires a frame buffer, thereby reducing the required resources.

A method for changing color of the drawing point based on the displacement from the polygon edge to the drawing point is known as the art. According to this method, the displacement from the polygon edge to each drawing point is calculated in order to draw the polygon edge, the color of the drawing point determined as being in a vicinity of the polygon edge is changed based on the displacement. Thus, it is possible to draw an anti-aliased polygon edge.

This method is disclosed, for example, in Japanese laid-open publication No. 6-4679 which is titled "Image processing apparatus". The apparatus disclosed in this reference includes a calculating means for sequentially calculating a linear expression in a two dimensional coordinate system for each edge of the polygon (i.e. each polygon edge), for determining a relative positional relationship of the drawing point with respect to the polygon, and for obtaining the displacement of each drawing point from the edges of the polygon. The apparatus disclosed in this reference further includes a changing means for changing the color or a tone of the color of the drawing point in the vicinity of the edges of the polygon based on the displacements obtained in the calculating means. The internal region of the polygon is either painted out or is shaded on the bit map memory.

However, in the conventional anti-aliasing method described above, the polygon edge must be expressed by a linear equation $f(x, y)=ax+by+c$, and this linear equation $f(x, y)$ is must be calculated using an area DDA (Digital Differential Analyzer; linear interpolation circuit), in order to obtain the displacement from the polygon edge to each drawing point. The color value of each drawing point is determined by referring to a table based on the displacement from the polygon edge to each drawing point and the inclination of the polygon edge, and then the color value is written into a frame buffer having a size corresponding to the actual display screen for storing display image data.

However, since this method requires using an area DDA, a frame buffer capable of storing at least one frame is required for storing display image data. This causes a problem that more memory space is required as the number of dots increases. This also causes another problem that a fixed amount of calculation occurs constantly regardless of the characteristics of the polygon edge, and therefore the calculation time becomes longer. This is because the same calculation method is applied regardless of the characteristics of the polygon edge (e.g. a left edge or a right edge, a positive value or a negative value of the increment in the X-axis direction, the inclination of the polygon edge).

The present invention is provided to solve the conventional problems described above. The object of the present invention is to provide a three dimensional graphics processing apparatus capable of performing an anti-aliasing processing in an sufficient manner, without using the conventional area DDA and any frame buffer required for the area DDA, by using a line buffer as an area for storing display image data to reduce the required memory area, while the increase of the calculation time is restricted by performing calculation suitable for the polygon edge without degrading the precision of the calculation, an image display apparatus including the three dimensional graphics processing apparatus, a three dimensional graphics processing method using the three dimensional graphics processing apparatus, a control program for making a computer execute the steps of the three dimensional graphics processing method, and a computer-readable recording medium on which the control program is recorded.

SUMMARY OF THE INVENTION

According to one aspect of the invention, a three dimensional graphics processing apparatus is provided. The three dimensional graphics processing apparatus includes: a polygon edge categorizing section for categorizing each of polygon edges included in a three dimensional polygon in accordance with an inclination of the polygon edge in the two dimensional XY-coordinate plane, the polygon edges being categorized into left edges and right edges; a coordinate calculating section for calculating coordinates of a drawing point having the smallest X-coordinate and coordinates of a drawing point having the largest X-coordinate, among drawing points corresponding to the respective intersection points between the polygon edge categorized by the polygon edge categorizing section and adjacent scanning lines; and an area ratio calculating section for calculating an area ratio of an internal region of the polygon occupied within a pixel of a predetermined unit region corresponding to each of the intersection points, based on the respective coordinates of the drawing points calculated by the coordinate calculating section.

In one embodiment of the invention, the polygon edge has a starting vertex and an ending vertex, and the polygon edge categorizing section includes: an X-axis direction difference computing section for subtracting a value of the X-coordinate of one of the starting vertex and the ending vertex of the polygon edge from a value of the X-coordinate of the other of the starting vertex and the ending vertex of the polygon edge so as to obtain a difference value of the X-coordinates; a Y-axis direction difference computing section for subtracting a value of the Y-coordinate of one of the starting vertex and the ending vertex of the polygon edge from a value of the Y-coordinate of the other of the starting vertex and the ending vertex of the polygon edge so as to obtain a difference value of the Y-coordinates; and a comparison/determination section for comparing the difference value of the X-coordinates with the difference value of the Y-coordinates, determining the inclination of the polygon edge based on the comparison result, and categorizing the polygon edge in accordance with the inclination of the polygon edge.

In one embodiment of the invention, the comparison/determination section categorizes the polygon edge such that, in a case where the inclination of the polygon edge is larger than 1, the polygon edge is categorized as being "left" when the polygon edge is a left edge and the polygon edge is categorized as being "right" when the polygon edge is a right edge.

In one embodiment of the invention, the comparison/determination section categorizes the polygon edge such that, in a case where the inclination of the polygon edge is smaller than or equal to 1, the polygon edge is categorized as being "upper" when the polygon edge is a left edge and the difference value of the X-coordinates is a negative value, the polygon edge is categorized as being "lower" when the polygon edge is a right edge and the difference value of the X-coordinates is a negative value, the polygon edge is categorized as being "lower" when the polygon edge is a left edge and the difference value of the X-coordinates is a positive value, and the polygon edge is categorized as being "upper" when the polygon edge is a right edge and the difference value of the X-coordinates is a positive value.

In one embodiment of the invention, the coordinate calculating section includes: an X-axis direction distance obtaining section for determining which of (i) rounding-off of a distance in the X-axis direction from the starting vertex of the polygon edge to the intersection point between the polygon edge and a scanning line by adding 0.5 to the distance and truncating the resultant decimal part and (ii) rounding-down of the distance in the X-axis direction from the starting vertex of the polygon edge to the intersection point between the polygon edge and the scanning line by truncating the decimal part of the distance should be performed based on the inclination of the polygon edge, so as to obtain an integer distance in the X-axis direction from the starting vertex of the polygon edge to the intersection point between the polygon edge and a current or a next scanning line.

In one embodiment of the invention, the X-axis direction distance obtaining section includes: an X-axis direction difference computing section for subtracting a value of the X-coordinate of one of the starting vertex and the ending vertex of the polygon edge from a value of the X-coordinate of the other of the starting vertex and the ending vertex of the polygon edge so as to obtain a difference value of the X-coordinates; a Y-axis direction difference computing section for subtracting a value of the Y-coordinate of one of the starting vertex and the ending vertex of the polygon edge from a value of the Y-coordinate of the other of the starting vertex and the ending vertex of the polygon edge so as to obtain a difference value of the Y-coordinates; an XY dividing section for dividing the difference value of the X-coordinates by the difference value of the Y-coordinates so as to obtain a ratio of increment of the polygon edge in the X-axis direction to increment of the polygon edge in the Y-axis direction; a scanning line incremental value calculating section for calculating the number of the scanning lines scanned from the starting vertex of the polygon edge to the current scanning line; a multiplying section for multiplying the ratio obtained by the XY dividing section by the number of the scanning lines calculated by the scanning line incremental value calculating section so as to obtain a distance in the X-axis direction from the starting vertex of the polygon edge to the current scanning line; and a rounding-off section for determining whether or not 0.5 is added to the distance in the X-axis direction obtained by the multiplying section based on the inclination of the polygon edge, and truncating the resultant decimal part so as to obtain the integer distance in the X-axis direction.

In one embodiment of the invention, the coordinate calculating section includes: an intersection point X-coordinate calculating section for calculating a value of the X-coordinate from the drawing point having the smallest X-coordinate and the drawing point having the largest X-coordinate, among the drawing points corresponding to the respective intersection points between the polygon edge and the adjacent scanning lines, based on the inclination of the polygon edge, the integer distance in the X-axis direction and the value of the X-coordinate of the starting vertex of the polygon edge.

In one embodiment of the invention, the area ratio calculating section determines which side of the right, left, upper and lower sides of the pixel is used to calculate the area ratio, based on information on the polygon edge, the X-coordinate of the drawing point having the smallest X-coordinate and the X-coordinate of the drawing point having the largest X-coordinate, and calculates the area ratio from the determined side of the pixel.

In one embodiment of the invention, the area ratio calculating section includes: a calculation method determining section for determining a calculation method by determining whether or not the polygon edge which is categorized as being "left" or "right" traverses at least two pixels from the time when the polygon edge intersects with the current scanning line to the time when the polygon edge intersects with the next scanning line, in a case where the inclination of the polygon edge is larger than 1.

According to another aspect of the invention, a three dimensional graphics processing method is provided. The three dimensional graphics processing method includes the steps of: (a) categorizing each of polygon edges included in a three dimensional polygon in accordance with an inclination of the polygon edge in the two dimensional XY-coordinate plane, the polygon edges being categorized into left edges and right edges; (b) calculating coordinates of a drawing point having the smallest X-coordinate and coordinates of a drawing point having the largest X-coordinate, among drawing points corresponding to the respective intersection points between the polygon edge categorized in the step (a) and adjacent scanning lines; and (c) calculating an area ratio of an internal region of the polygon occupied within a pixel of a predetermined unit region corresponding to each of the intersection points, based on the respective coordinates of the drawing points calculated in the step (b).

In one embodiment of the invention, the polygon edge has a starting vertex and an ending vertex, and the step (a) includes the steps of: subtracting a value of the X-coordinate of one of the starting vertex and the ending vertex of the polygon edge from a value of the X-coordinate of the other of the starting vertex and the ending vertex of the polygon edge so as to obtain a difference value of the X-coordinates; subtracting a value of the Y-coordinate of one of the starting vertex and the ending vertex of the polygon edge from a value of the Y-coordinate of the other of the starting vertex and the ending vertex of the polygon edge so as to obtain a difference value of the Y-coordinates; and comparing the difference value of the X-coordinates with the difference value of the Y-coordinates, determining the inclination of the polygon edge based on the comparison result, and categorizing the polygon edge in accordance with the inclination of the polygon edge.

In one embodiment of the invention, the step (b) includes the steps of: (d) determining which of (i) rounding-off of a distance in the X-axis direction from the starting vertex of the polygon edge to the intersection point between the polygon edge and a scanning line by adding 0.5 to the distance and truncating the resultant decimal part and (ii) rounding-down of the distance in the X-axis direction from the starting vertex of the polygon edge to the intersection point between the polygon edge and the scanning line by truncating the decimal part of the distance should be performed based on the inclination of the polygon edge, so as to obtain an integer distance in the X-axis direction from the starting vertex of the polygon edge to the intersection point between the polygon edge and a current or a next scanning line; and (e) calculating a value of the X-coordinate from the drawing point having the smallest X-coordinate and the drawing point having the largest X-coordinate, among the drawing points corresponding to the respective intersection points between the polygon edge and the adjacent scanning lines, based on the inclination of the polygon edge, the integer distance in the X-axis direction and the value of the X-coordinate of the starting vertex of the polygon edge.

In one embodiment of the invention, the step (d) includes the steps of: subtracting a value of the X-coordinate of one of the starting vertex and the ending vertex of the polygon edge from a value of the X-coordinate of the other of the starting vertex and the ending vertex of the polygon edge so as to obtain a difference value of the X-coordinates; subtracting a value of the Y-coordinate of one of the starting vertex and the ending vertex of the polygon edge from a value of the Y-coordinate of the other of the starting vertex and the ending vertex of the polygon edge so as to obtain a difference value of the Y-coordinates; dividing the difference value of the X-coordinates by the difference value of the Y-coordinates so as to obtain a ratio of increment of the polygon edge in the X-axis direction to increment of the polygon edge in the Y-axis direction; calculating the number of the scanning lines scanned from the starting vertex of the polygon edge to the current scanning line; multiplying the ratio obtained in the dividing step by the number of the scanning lines so as to obtain a distance in the X-axis direction from the starting vertex of the polygon edge to the current scanning line; and determining whether or not 0.5 is added to the distance in the X-axis direction obtained in the multiplying step based on the inclination of the polygon edge, and truncating the resultant decimal part so as to obtain the integer distance in the X-axis direction.

In one embodiment of the invention, the polygon edge has a starting vertex and an ending vertex, the step (c) includes the steps of: subtracting a value of the X-coordinate of one of the starting vertex and the ending vertex of the polygon edge from a value of the X-coordinate of the other of the starting vertex and the ending vertex of the polygon edge so as to obtain a difference value of the X-coordinates; subtracting a value of the Y-coordinate of one of the starting vertex and the ending vertex of the polygon edge from a value of the Y-coordinate of the other of the starting vertex and the ending vertex of the polygon edge so as to obtain a difference value of the Y-coordinates; dividing the difference value of the Y-coordinates by the difference value of the X-coordinates so as to obtain a ratio of increment of the polygon edge in the Y-axis direction to increment of the polygon edge in the X-axis direction; determining which side of the right, left, upper and lower sides of the pixel is used to calculate the area ratio in accordance with the inclination of the polygon edge and the sign of the difference value of the X-coordinates, and calculating the area ratio based on a distance from the determined side of the pixel to the polygon edge, when the area ratio is calculated based on the respective coordinates calculated in the step (b) and the ratio obtained in the dividing step.

In one embodiment of the invention, in the calculating the area ratio, when the inclination of the polygon edge is larger than 1, if the polygon edge traverses a pixel boundary between the current scanning line and the next scanning line, then a constant area ratio is used, otherwise the area ratio is obtained by calculation.

According to another aspect of the invention, a control program is provided for making a computer execute the steps of the three dimensional graphics processing method described above.

According to another aspect of the invention, a computer-readable recording medium is provided. The computer-readable recording medium has recorded thereon the control program described above.

According to another aspect of the invention, an image display apparatus is provided. The image display apparatus is capable of displaying an image on a screen utilizing the three dimensional graphics processing apparatus described above.

The functions of the present invention will be described below.

According to the present invention, it is possible to calculate the coordinates of the intersection points between the polygon edge and the scanning lines from information on the starting vertex and the ending vertex of the polygon edge and information on the scanning lines. The calculation method is changed in accordance with the characteristics of the polygon edge. Further, it is possible to obtain a blending coefficient for the anti-aliasing process by calculating an area ratio of an internal region of the polygon occupied within a pixel of a predetermined unit region corresponding to each of the intersection points between the polygon edge and the scanning lines. As a result, it is possible to perform an anti-aliasing processing in an sufficient manner, without using the conventional area DDA and any frame buffer required for the area DDA. This is achieved by using a line buffer as an area for storing display image data to reduce the required memory area, while the increase of the calculation time is restricted by performing calculation suitable for the polygon edge without degrading the precision of the calculation.

According to the present invention, when the coordinates of the intersection points between the polygon edge and the scanning lines are calculated based on only information on the starting vertex and the ending vertex of the polygon edge and information on the scanning lines, a calculation method most suitable for each case is applied in accordance with the inclination of the polygon edge and a relationship between the X-coordinate of the starting vertex and the X-coordinate of the ending vertex. According to this, it is possible to specify the drawing points at a higher speed and with a higher precision. Further, it is possible to use a drawing method using very small memory areas such as a line buffer, since the processing of the drawing point does not depend on any information on the drawing points located above and/or below.

Furthermore, even when a polygon edge is shared by two polygons, a border of the two polygons can be uniquely determined. Furthermore, in addition to categorizing each polygon edge in a similar manner when the area ratio of an internal region of the polygon occupied within a pixel for each drawing point is calculated, by changing a calculation method in accordance with a relationship between the polygon edge and the pixel boundary, it is possible to determine the area ratio at a higher speed and without degrading precision and to utilize a line buffer in the anti-aliasing process. As a result, it is possible to perform an anti-aliasing processing without requiring a large amount of memory regions or processing time which would be required by the conventional techniques.

These and other advantages of the present invention will become apparent to those skilled in the art upon reading and understanding the following detailed description with reference to the accompanying figures.

Figure 1:
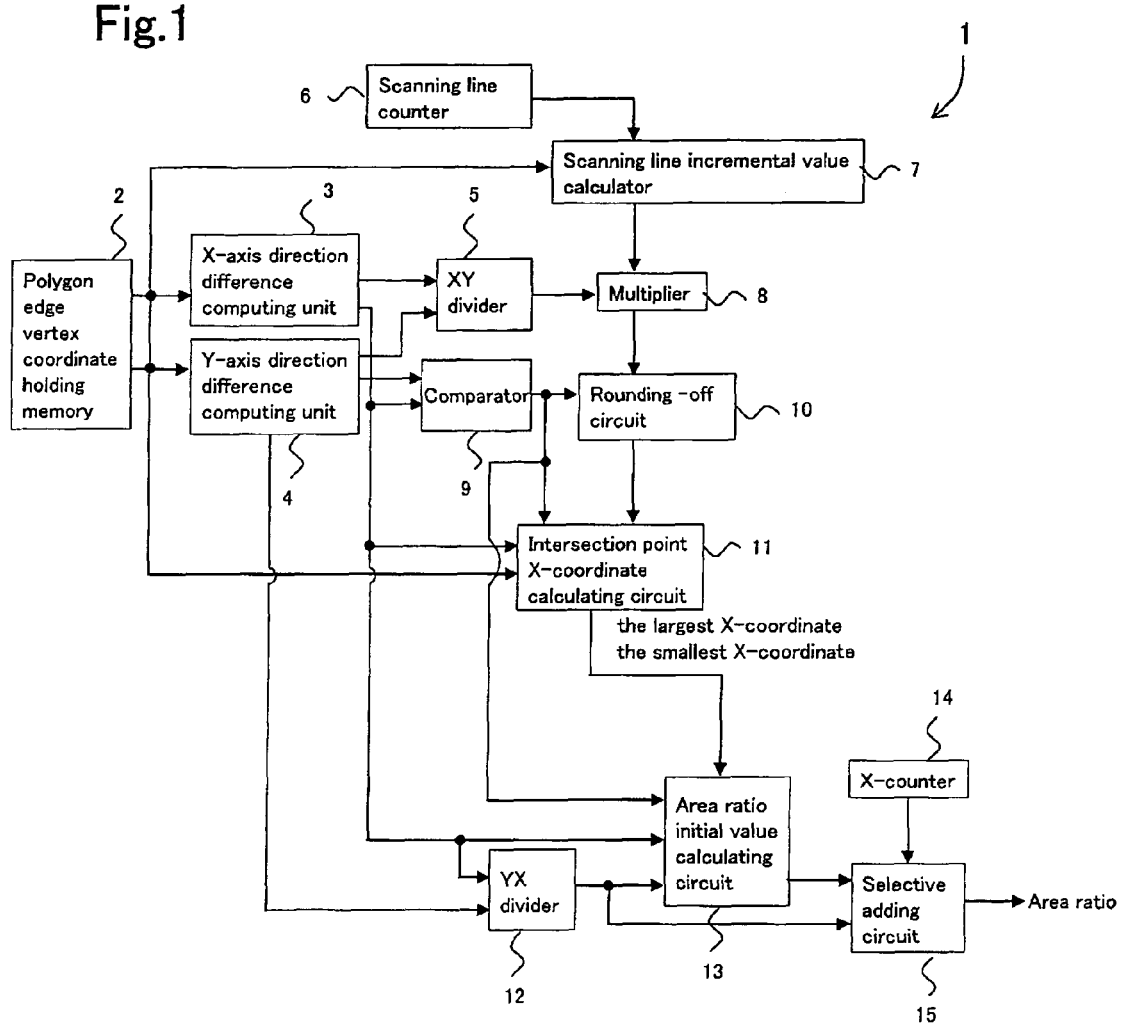
FIG. 1 is a block diagram showing an example of a structure of the three dimensional graphics processing apparatus according to an embodiment of the present invention.

1 Three dimensional graphics processing apparatus
2 Polygon edge vertex coordinate holding memory
3 X-axis direction difference computing unit
4 Y-axis direction difference computing unit
5 XY divider
6 Scanning line counter
7 Scanning line incremental value calculator
8 Multiplier
9 Comparator
10 Rounding-off circuit
11 Intersection point X-coordinate calculating circuit
12 YX divider
13 Area ratio initial value calculating circuit
14 X-counter
15 Selective adding circuit

DESCRIPTION OF THE PREFERRED EMBODIMENTS

The following describes in detail embodiments of a three dimensional graphics processing apparatus and a three dimensional graphics processing method according to the present invention, with reference to the drawings.

FIG. 1 is a block diagram showing an example of a structure of the three dimensional graphics processing apparatus according to an embodiment of the present invention.

In FIG. 1, the three dimensional graphics processing apparatus 1 according to the present embodiment includes: a polygon edge vertex coordinate holding memory 2; an X-axis direction difference computing unit 3 as an X-axis direction difference computing section: a Y-axis Direction difference computing unit 4 as a Y-axis direction difference computing section; an XY divider 5 as an XY dividing section; a scanning line counter 6 as a scanning line counting section; a scanning line incremental value calculator 7 as a scanning line incremental value calculating section; a multiplier 8 as a multiplying section; a comparator 9 as a comparison/determination section; a rounding-off circuit 10 as a rounding-off section; an intersection point X-coordinate calculating circuit 11 as an intersection point X-coordinate calculating section; a YX divider 12 as a YX dividing section; an area ratio initial value calculating circuit 13 as an area ratio initial value calculating section; an X-counter 14 as an X-counter section; and a selective adding circuit 15 as a selective adding section.

The polygon edge vertex coordinate holding memory 2 stores X and Y-coordinate values of a starting vertex and an ending vertex of each of polygon edges, wherein the polygon edges are categorized into left edges and right edges. These coordinate values are input to the X-axis direction difference computing unit 3 and the Y-axis direction difference computing unit 4. The X-coordinate value obtained from the polygon edge vertex coordinate holding memory 2 is input to the intersection point X-coordinate calculating circuit 11, and is used therein. The Y-coordinate value obtained from the polygon edge vertex coordinate holding memory 2 is input to the scanning line incremental value calculator 7, and is used therein. Herein, each of the polygon edges is categorized as being a left edge or a right edge. When a scanning line traverses a polygon, the scanning line traverses two polygon edges. Among two polygon edges which the scanning line traverses, a polygon edge at a left side is defined as a left edge and a polygon edge at a right side is defined as a right edge.

The X-axis direction difference computing unit 3 calculates a difference value of X-coordinates by subtracting a value of the X-coordinate of the ending vertex of the polygon edge from a value of the X-coordinate of the starting vertex of the polygon edge, for each polygon edge which is categorized into a left edge or a right edge.

The Y-axis direction difference computing unit 4 calculates a difference value of Y-coordinates by subtracting a value of the Y-coordinate of the ending vertex of the polygon edge from a value of the Y-coordinate of the starting vertex of the polygon edge, for each polygon edge which is categorized into a left edge or a right edge.

The XY divider 5 calculates a ratio of increment of the polygon edge in the X-axis direction to increment of the polygon edge in the Y-axis direction by dividing the difference value of the X-coordinates by the difference value of the Y-coordinates.

The scanning line counter 6 counts the scanning line, and it is counted up when a scanning line to be processed is changed from the current scanning line to the next scanning line.

The scanning line incremental value calculator 7 calculates the number of the scanning lines which have been scanned from the starting vertex of the polygon edge to the current scanning line, by subtracting a value sy_left of the Y-coordinate of the starting vertex from a value ScanY of the current scanning line.

The multiplier 8 calculates a distance in the X-axis direction from the starting vertex of the polygon edge to an intersection point between the polygon edge and the current scanning line, by multiplying the number of scanning lines obtained by the scanning line incremental value calculator 7 by the ratio obtained by the XY divider 5.

The comparator 9 compares the absolute value of the difference value of the X-coordinates from the X-axis direction difference computing unit 3 with the difference value of the Y-coordinates from the Y-axis direction difference computing unit 4, and determines an inclination of the polygon edge based on the comparison result.

In a case where the inclination of the polygon edge is larger than 1, the polygon edge is categorized as being "left" when the polygon edge is a left edge, and the polygon edge is categorized as being "right" when the polygon edge is a right edge.

Figure 4:
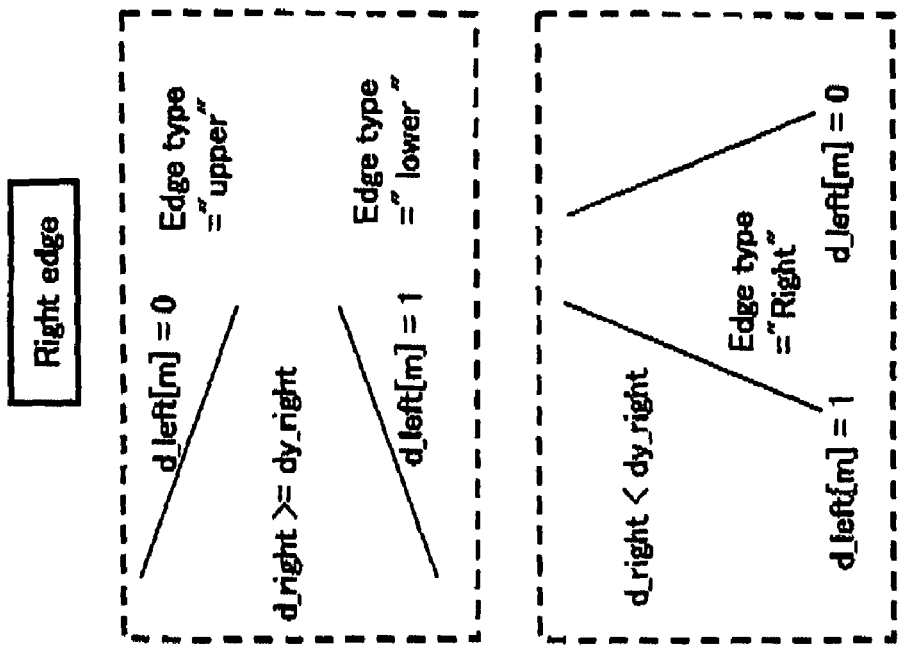
FIG. 4 is a diagram showing a method for categorizing the polygon edge when the polygon edge is a left edge.

As shown in FIG. 4, in a case where the inclination of the polygon edge is smaller than or equal to 1, the polygon edge is categorized as being "upper" when the polygon edge is a left edge and the difference value of the X-coordinates is a negative value, the polygon edge is categorized as being "lower" when the polygon edge is a right edge and the difference value of the X-coordinates is a negative value, the polygon edge is categorized as being "lower" when the polygon edge is a left edge and the difference value of the X-coordinates is a positive value, the polygon is categorized as being "lower" when the polygon edge is a right edge and the difference value of the X-coordinates is a positive value.

Thus, a polygon edge categorizing section is configured by the polygon edge vertex coordinate holding memory 2, the X axis direction difference computing unit 3, the Y-axis direction difference computing unit 4 and the comparator 9. The polygon edge categorizing section categorizes each of polygon edges included in a three dimensional polygon in accordance with an inclination of the polygon edge in the two dimensional XY-coordinate plane, wherein the polygon edges axe categorized into left edges and right edges.

The rounding-off circuit 10 determines whether or not 0.5 is added to a distance in the X-axis direction from the starting vertex of the polygon edge to the intersection point between the polygon edge and the current scanning line (i.e. the output value from the multiplier 8), in accordance with the comparison result by the comparator 9 (i.e. the inclination of the polygon edge), and obtains an integer distance in the X-axis direction by truncating the decimal part of the resultant value.

Thus, an X-axis direction distance obtaining section is configured by the polygon edge vertex coordinate holding memory 2, the X-axis direction difference computing unit 3, the Y-axis direction difference computing unit 4, the XY divider 5, the scanning line counter 6, the scanning line incremental value calculator 7, the multiplier 8, and the rounding-off circuit 10. The X-axis direction distance obtaining section obtains an integer distance in the X-axis direction from the starting vertex of the polygon edge to the intersection point between the polygon edge and the current or the next scanning line, by determining which of a rounding-off and a rounding-down should be performed with respect to a distance in the X-axis direction from the starting vertex of the polygon edge to the intersection point between the polygon edge and the scanning line, based on the inclination of the polygon edge. The rounding-off is performed by adding 0.5 to the distance in the X-axis direction from the starting vertex of the polygon edge to the intersection point between the polygon edge and the scanning line and truncating the decimal part of the resultant distance. The rounding-down is performed by truncating the decimal part of the distance in the X-axis direction from the starting vertex of the polygon edge to the intersection point between the polygon edge and the scanning line.

The intersection point X-coordinate calculating circuit 11 calculates a value of the X-coordinate from the drawing point having the smallest X-coordinate to the drawing points having the largest X-coordinate, among the drawing points corresponding to the respective intersection points between the polygon edge and the adjacent scanning lines (i.e. the current scanning line and the next scanning line). This calculation is selectively made by utilizing the integer distance in the X-axis direction obtained by the rounding-off circuit 10 in accordance with the sign of the difference value of the X-coordinates from the X-axis direction difference computing unit 3.

The YX divider 12 calculates a ratio of increment of the polygon edge in the Y-axis direction to increment of the polygon edge in the X-axis direction, by dividing the absolute value of the difference value of the Y-coordinates by the difference value of the X-coordinates.

The area ratio initial value calculating circuit 13 calculates an area ratio of an internal region of the polygon occupied within a pixel corresponding to each of the intersection points between the polygon edge and the adjacent scanning lines, based on the ratio calculated by the YX divider 12 and the value of the X-coordinate of the drawing point from the intersection point X-coordinate calculating circuit 11. During this calculation, the area ratio initial value calculating circuit 13 determines which side of the right, left, upper and lower sides of the pixel is used to calculate the area ratio in accordance with the inclination of the polygon edge and the sign of the difference value of the X-coordinates, and calculates the area ratio with respect to the drawing point having the smallest X-coordinate based on a distance from the determined side of the pixel to the polygon edge.

The X-counter 14 counts the X-coordinate of the drawing point when a pixel to be processed is changed from the current pixel to the next pixel along the scanning line.

Figure 10:
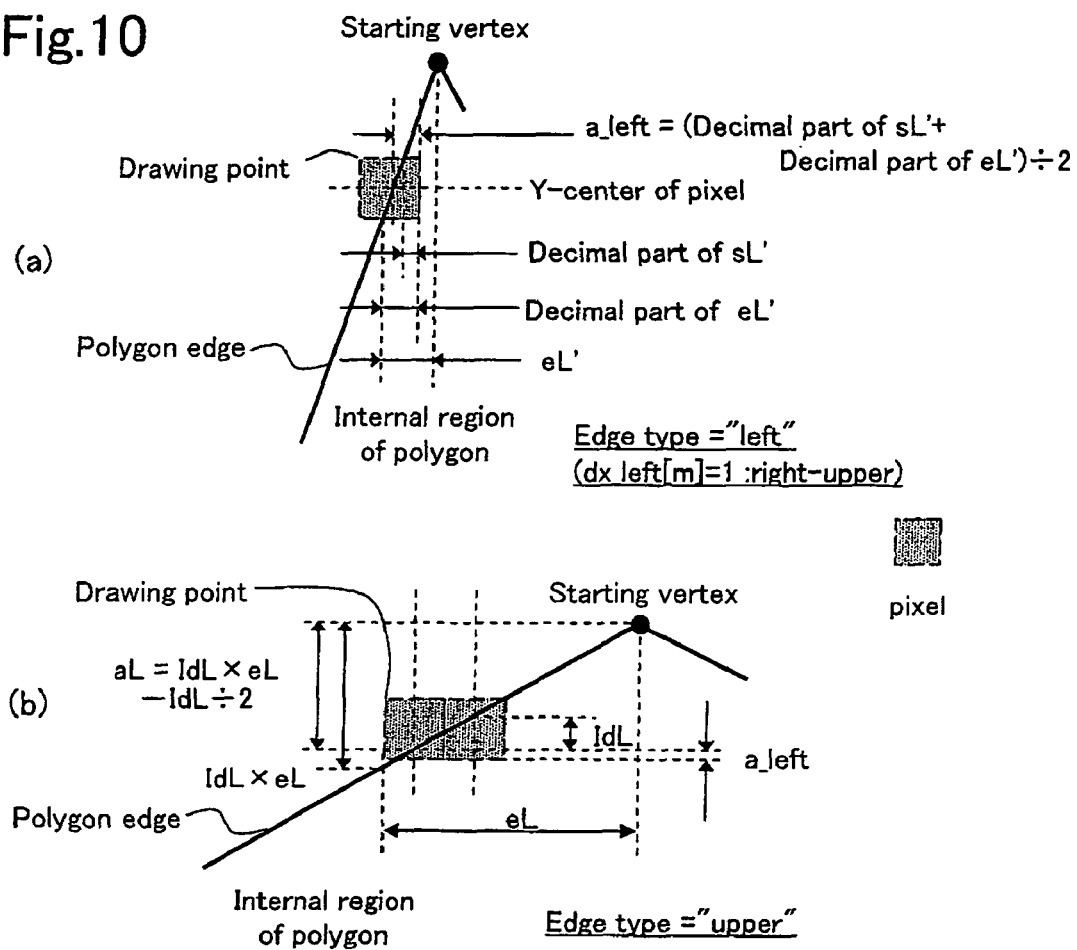
FIG. 10 includes portion (a) and portion (b) each showing an example of a method in the present invention for calculating the area ratio of an internal region of the polygon within a pixel, according to the edge type.

The selective adding circuit 15 utilizes the counted X-coordinate of the drawing point to add Y-coordinate increments IdL per X-coordinate +1 to a value of the area ratio with respect to the adjacent pixel at the left side, like an example of edge type "upper" shown in portion (b) of FIG. 10. In this manner, the area ratio up to the drawing point having the largest X-coordinate can be sequentially obtained.

Thus, an area ratio calculating section is configured by the YX divider 12, the area ratio initial value calculating circuit 13, the X-counter 14 and the selective adding circuit 15. The area ratio calculating section calculates an area ratio of an internal region of the polygon occupied within a pixel of a predetermined unit region corresponding to each of the intersection points between the polygon edge and the adjacent scanning line, based on the respective coordinates of the drawing points calculated by the coordinate calculating section.

When the area ratio of the interior region of the polygon occupied within the pixel is calculated, the area ratio calculating section determines which side of the right, left, upper and lower sides of the pixel is used to calculate the area ratio, based on information on the polygon edge obtained by the polygon edge categorizing section, the X-coordinate of the drawing point having the smallest X-coordinate and the X-coordinate of the drawing point having the largest X-coordinate obtained by the coordinate calculating section, and calculates the area ratio from the determined edge of the pixel.

Further, the area ratio calculating section includes a calculation method determining section for determining a calculation method (i.e. using a constant area ratio or calculating an area ratio in detail) by determining whether or not the polygon edge which is categorized as being "left" or "right" traverses at least two pixels from the time when the polygon edge intersects with the current scanning line to the time when the polygon edge intersects with the next scanning line.

The structure of the three dimensional graphics processing apparatus 1 described above will be described below in more detail as well as its operation.

The X-axis direction difference computing unit 3 accesses the polygon edge vertex coordinate holding memory 2 to obtain a value of the X-coordinate of the starting vertex of the polygon edge and a value of the X-coordinate of the ending vertex of the polygon edge, and calculates a signed difference value in the X-axis direction by subtracting the value of the X-coordinate of the starting vertex of the polygon edge from the value of the X-coordinate of the ending vertex of the polygon edge. The most significant bit m of the signed difference value in the X-axis direction represents a sign, whereas the remaining bits of the signed difference value in the X-axis direction represents an absolute value of the signed difference value in the X-axis direction.

When the polygon edge is a left edge, the signed difference value in the X-axis direction (dx_left) is represented as follows:

the difference value in the X-axis direction (signed): dx_left=ex_left−sx_left, the difference value in the X-axis direction (absolute value): d_left=dx_left [m−1:0], the difference value in the X-axis direction (sign): dx_left [m] (1:negative 0:positive), where ex_left denotes a value of the X-coordinate of the ending vertex of the left edge, and sx_left denotes a value of the X-coordinate of the starting vertex of the left edge.

When the polygon edge is a right edge, the signed difference value in the X-axis direction (dx_right) is represented as follows:

the difference value in the X-axis direction (signed): dx_right ex_right−sx_right, the difference value in the X-axis direction (absolute value): d_right=dx_right [m−1:0], the difference value in the X-axis direction (sign): dx_right [m] (1:negative 0:positive), where ex_right denotes a value of the X-coordinate of the ending vertex of the right edge, and sx_right denotes a value of the X-coordinate of the starting vertex of the right edge.

Figure 2:
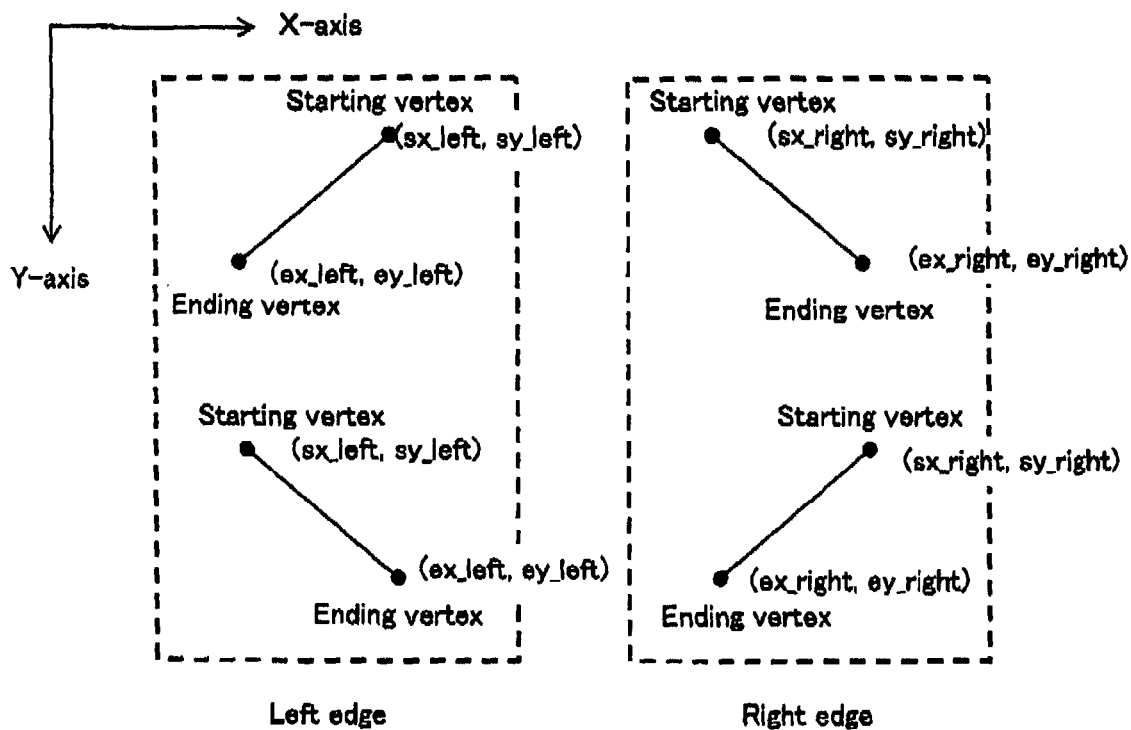
FIG. 2 is a diagram showing a method on how to determine a starting vertex and an ending vertex of the polygon edge in the present invention.

The Y-axis direction difference computing unit 4 accesses the polygon edge vertex coordinate holding memory 2 to obtain a value of the Y-coordinate of the starting vertex of the polygon edge and a value of the Y-coordinate of the ending vertex of the polygon edge, and calculates a difference value in the Y-axis direction by subtracting the value of the Y-coordinate of the starting vertex of the polygon edge from the value of the Y-coordinate of the ending vertex of the polygon edge. In this case, as shown in FIG. 2, the starting vertex and the ending vertex are defined such that the value of the Y-coordinate of the starting vertex becomes smaller than the value of the Y-coordinate of the ending vertex. Accordingly, the difference value in the Y-axis direction is always a positive value.

When the polygon edge is a left edge, the difference value in the Y-axis direction (dy_left) is represented as follows:

the difference value in the Y-axis direction (positive value): dy_left=ey_left−sy_left, where ey_left denotes a value of the Y-coordinate of the ending vertex of the left edge, and sy_left denotes a value of the Y-coordinate of the starting vertex of the left edge.

When the polygon edge is a right edge, the difference value in the Y-axis direction (dy_right) is represented as follows:

the difference value in the Y-axis direction (positive value): dy_right=ey_right−sy_right, where ey_right denotes a value of the Y-coordinate of the ending vertex of the right edge, and sy_right denotes a value of the Y-coordinate of the starting vertex of the right edge.

Based on the absolute value of the difference value of the X axis direction and the difference value of the Y-axis direction obtained in the manner described above, an unsigned ratio of increment in the X-axis direction to increment in the Y-axis direction, along a direction from the starting vertex of the polygon edge to the ending vertex of the polygon edge, is calculated by the XY divider 5.

Next, with reference to FIG. 3 where the polygon edge is a left edge, a method will be described for obtaining an X-coordinate integer value sxL of the drawing point having the smallest X-coordinate (hereinafter "intersection starting drawing point") and an X-coordinate integer value exL of the drawing point having the largest X-coordinate (hereinafter "intersection ending drawing point"), among the drawing points at intersection points between the polygon edge and the scanning lines. In a case where the polygon edge is a right edge, the X-coordinate integer values can be obtained in a similar manner.

The scanning line counter 6 holds a current scanning line value ScanY indicating a current scanning line. The current scanning line value ScanY is counted up when a scanning line to be processed is changed from the current scanning line to the next scanning line.

The scanning line incremental value calculator 7 calculates the number of scanning lines scanned from the starting vertex to the current scanning line, by subtracting the value of the Y-coordinate of the starting vertex sy_left from the current scanning line value ScanY. The calculated number of the scanning lines corresponds to incremental value in the Y-axis direction from the starting vertex to the current scanning line.

The multiplier 8 multiplies the output value of the XY divider 5 by the output value of the scanning line incremental value calculator 7, and obtains the incremental value sL_tmp of the X-axis direction from the starting vertex of the polygon edge to the intersection point between the polygon edge and the current scanning line, where the incremental value sL_tmp of the X-axis direction includes a decimal part. At the same time, it obtains the incremental value eL_tmp of the X-axis direction from the starting vertex of the polygon edge to the intersection point between the polygon edge and the next scanning line.

Next, a process for obtaining the X-coordinates of the drawing points at the respective intersection points between the polygon edge and the adjacent scanning lines will be described. In this process, as shown in FIG. 4 for a case where the polygon edge is a left edge (see FIG. 5 for a case where the polygon edge is a right edge), the polygon edge is categorized in accordance with the result of the comparison between the absolute value of the difference value in the X-axis direction (d_left) and the difference value in the Y-axis direction (dy_left) by the comparator 9 and the signed output (dx_left [m]) of the X-axis direction difference computing unit 3.

Specifically, if the absolute value of the difference value in the X-axis direction (dx_left) is smaller than the difference value in the Y axis direction (dy_left) (i.e. a relationship of dx_left<dy_left is satisfied), then the polygon edge is categorized as edge type "left". When this is not the case (i.e. a relationship of dx_left≧dy_left is satified), if the signed output dx_left[m]=1, then the polygon edge is categorized as edge type "upper", and if the signed output dx_left[m]=0, the polygon edge is categorized as edge type "lower".

For a standing polygon edge such as a polygon edge of edge type "left", the inclination of the polygon edge is larger than 1 (i.e. a relationship of d_left<dy_left is satisfied). In this case, the change in the X-axis direction remains below ±1 during a period when a process proceeds one scanning line from the current scanning line to the next scanning line. During this period, there exists only one drawing point.

On the other hand, for a laying down polygon edge such as a polygon edge of edge type "upper" or "lower", the inclination of the polygon edge is smaller than or equal to 1 (i.e. a relationship of d_left≧dy_left is satisfied). In this case, the change in the X-axis direction is two or more during a period when a process proceeds one scanning line. Accordingly, a calculating process is performed separately in each of these two cases.

Figure 6:
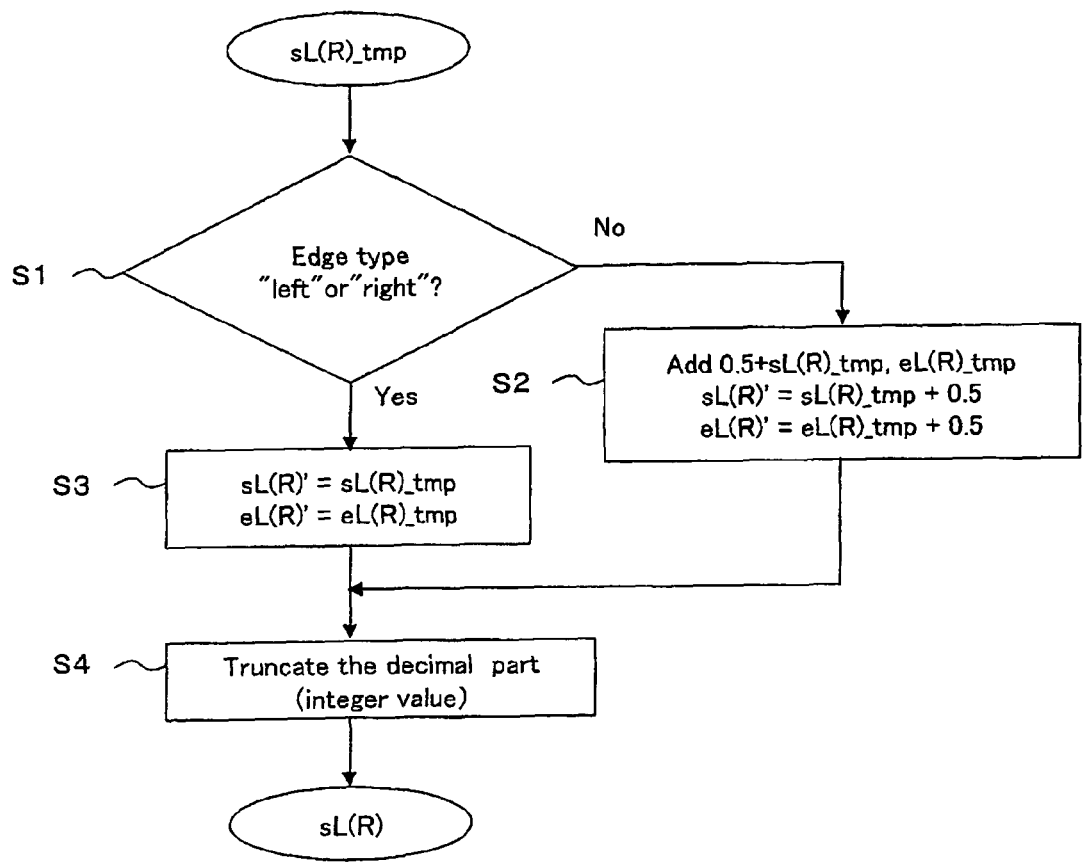
FIG. 6 is a flowchart showing an operation of the rounding-off circuit shown in FIG. 1.

The flow of the actual calculating process will be described below with reference to FIG. 6.

In step S1, the rounding-off circuit 10 determines an edge type of the polygon edge based on an identification signal from the comparator 9. When it is determined that the edge type is neither "left" nor "right" ("No" in step S1), the process proceeds to step S2. In step S2, sL' is obtained by adding 0.5 to sL_tmp and eL' is obtained by adding 0.5 to eL_tmp in a case where the polygon edge is a left edge (sR' is obtained by adding 0.5 to sR_tmp and eR' is obtained by adding 0.5 to eR_tmp in a case where the polygon edge is a right edge). When it is determined that the edge type is "left" or "right" ("Yes" in step S1), the process proceeds to step S3. In step S3, sL' is obtained as sL_tmp and eL' is obtained as eL_tmp in a case where the polygon edge is a left edge (sR' is obtained as sR_tmp and eR' is obtained as eR_tmp in a case where the polygon edge is a right edge).

In step S4, the rounding-off circuit 10 truncates the decimal part of the resultant value so as to generate an integer value. Thus, a distance sL in the X-axis direction from the starting vertex to the intersection staring drawing point is obtained by truncating the decimal part of the value sL'. This means that the distance sL in the X-axis direction is obtained by performing the rounding-off of the value sL_tmp for the polygon edge of edge type "upper" or "lower", and that the distance sL in the X-axis direction is obtained by performing the rounding-down of the value sL_tmp for the polygon edge of edge type "left" or "right". The rounding-off of the value sL_tmp is not performed for the polygon edge of edge type "left" or "right". This is because there exists only one drawing point during a period when the process proceeds one scanning line and there are no visible differences. In a similar manner, a distance eL in the X-axis direction from the starting vertex to the intersection ending drawing point can be obtained from the value eL_temp. Further, in a similar manner, a distance sR and a distance eR can be obtained.

Figure 7:
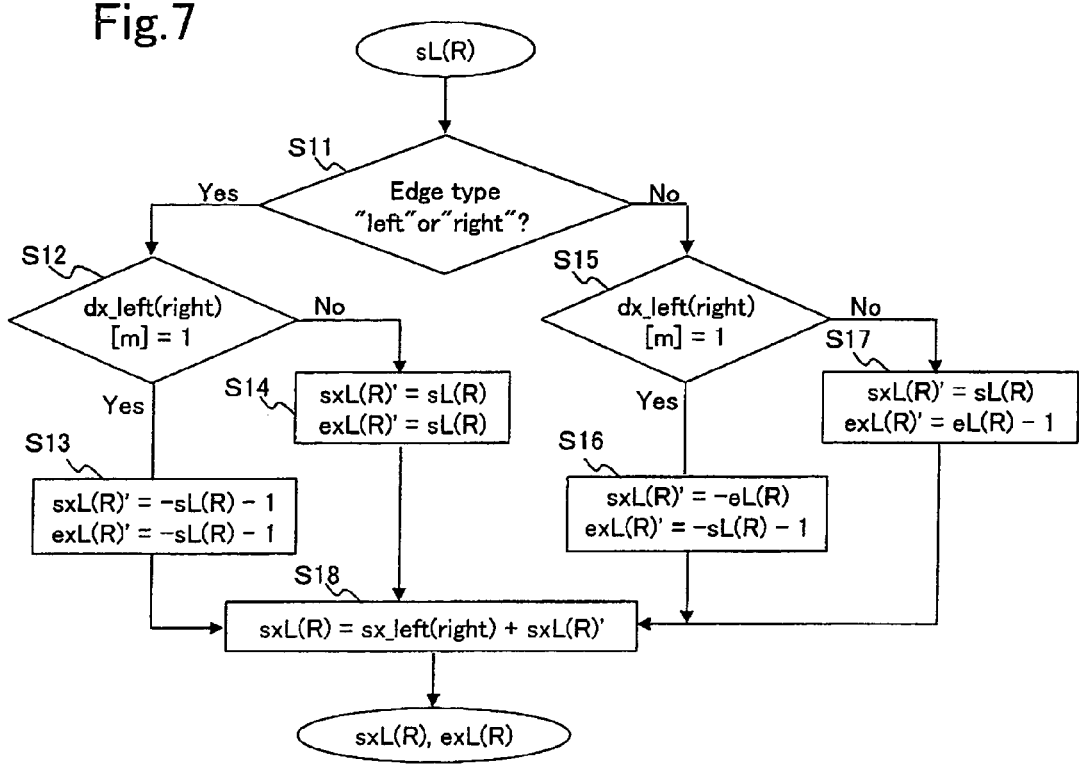
FIG. 7 is a flowchart showing an operation of the intersection point X-coordinate calculating circuit shown in FIG. 1.

Next, the intersection point X-coordinate calculating circuit 11 performs a process shown in FIG. 7 in accordance with the identification signal from the comparator 9 and the signed output dx_left [m] from the X-axis direction difference computing unit 3, in order to finally obtain the values sxL and exL.

The integer values of X-coordinates sxL and exL of the drawing points are calculated using the values sL and eL from the the rounding-off circuit 10 and the value of X-coordinate sx_left of the starting vertex from the polygon edge vertex coordinate holding memory 2.

The steps shown in FIG. 7 will be described below.

In step S11, the intersection point X-coordinate calculating circuit 11 determines an edge type of the polygon edge. Depending on the edge type of the polygon edge, the steps S12 to S18 are performed as necessary in order to obtain a distance correction value sxL' in the X-axis direction from the starting vertex to the intersection starting drawing point and a distance correction value exL' in the X-axis direction from the starting vertex to the intersection ending drawing point.

When it is determined that the edge type is "left" or "right" ("Yes" in step S11), only the value sL is used to obtain the values sxL' and exL'. When it is determined that the sign dx_left [m] output from the X-axis direction difference computing unit 3 is 1 (i.e. the signed value is negative) ("Yes" step S12), both sxL' and exL' are set to be –sL-1 in step S13. When it is determined that the sign dx_left [m] output from the X-axis direction difference computing unit 3 is 0 (i.e. the signed value is positive) ("No" in step S12), both sxL' and exL' are set to be sL in step S14. As described above, when the edge type is "left" or "right", there exists only one drawing point during a period when the process proceeds one scanning line. Accordingly, the values of sxL' and exL' are immediately determined as the same value once the value of sL is determined.

When it is determined that the edge type is neither "left" nor "right" ("No" in step S11), the values sL and eL are used to obtain the values sxL' and exL'. When it is determined that the sign dx_left [m] output from the X-axis direction difference computing unit 3 is 1 (i.e. the signed value is negative) ("Yes" in step S15), sxL' is set to be –eL and exL' is set to be –sL-1 in step S16. When the sign dx_left [m] output from the X-axis direction difference computing unit 3 is 0 (i.e. the signed value is positive) ("No" in step S15), sxL' is set to be sL and exL' is set to be eL-1 in step S17.

Figure 8:
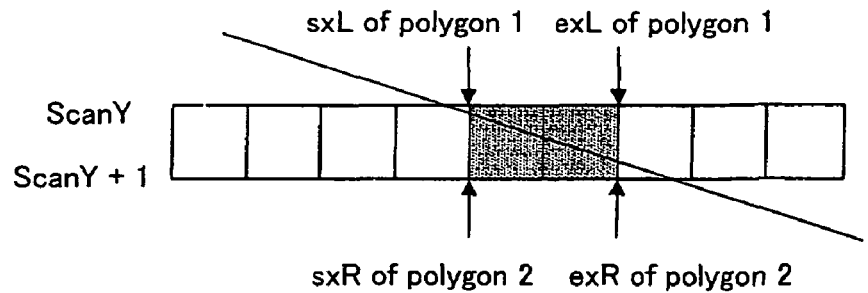
FIG. 8 is a diagram showing an example of the calculation result of the drawing points when the polygon edge is a boundary of adjacent two polygons.

Finally, in step S18, the X-coordinate sxL of the intersection starting drawing point is obtained by adding sx_left to sxL', and the X-coordinate exL of the intersection ending drawing point is obtained by adding sx_left to exL'. Further, the drawing points between the intersection starting drawing point and the intersection ending drawing point have the X-coordinate as an integer value between sxL and exL. By calculating sxL' and exL' in this manner, even if one polygon edge is shared by two polygons (e.g. polygon 1 and polygon 2) which are adjacent to each other, the drawing points of the shared polygon edge of the polygon 1 can be aligned with the drawing points of the shared polygon edge of the polygon 2, as shown in FIG. 8, thereby completing the drawing process without any inconsistencies.

Figure 3:
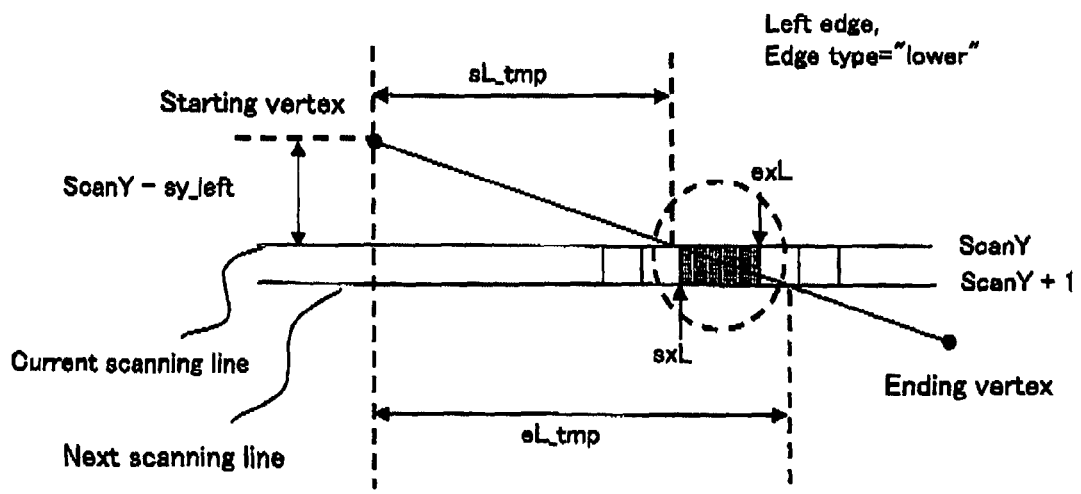
FIG. 3 is a diagram showing an example of the relationship between the polygon edge and scanning lines in the present invention.
Figure 9:
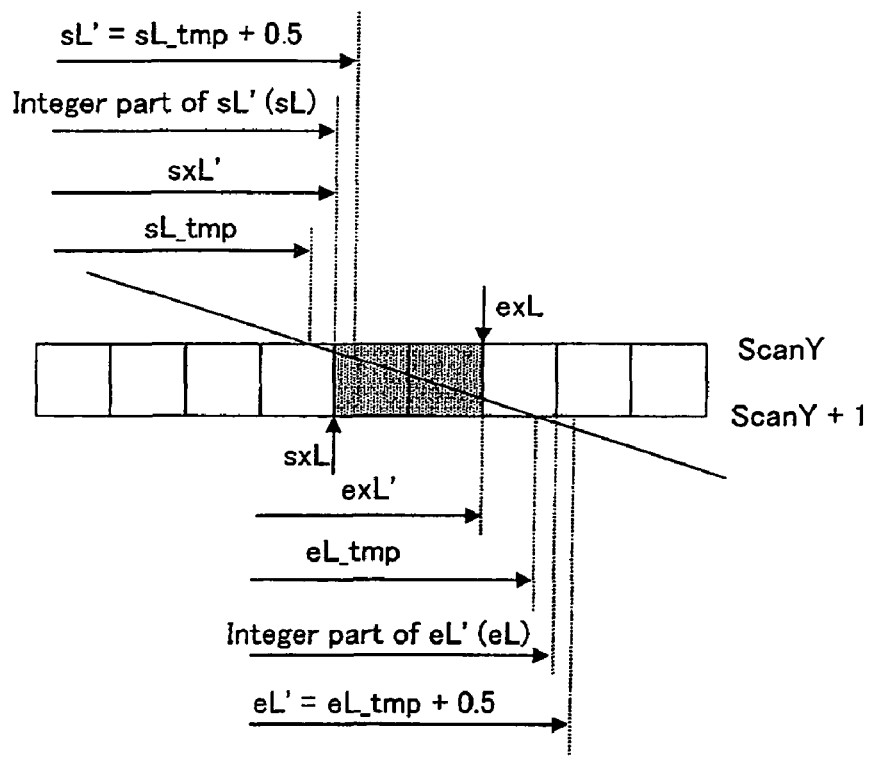
FIG. 9 is a diagram showing various distances in the vicinity of the intersection point between the polygon edge and the scanning lines shown in FIG. 3.

FIG. 9 is an enlarged view of the part indicated by a circle shown in FIG. 3 for illustrating the process described above. FIG. 9 illustrates examples of the actual values in a case where the polygon edge is a left edge and the edge type is "lower".

Thus, it is possible to calculate the X-coordinate of each drawing point located between the intersection point between the polygon edge and the current scanning line and the intersection point between the polygon edge and the next scanning line. This makes it possible to efficiently draw the polygon edge.

Next, a method for calculating an area of an internal region of the polygon occupied within a pixel at the drawing point where the polygon edge intersects with the scanning line using the values sxL and exL calculated in the process described above will be described below with reference to FIG. 10.

Portion (a) and Portion (b) of FIG. 10 each show an example of calculation required for obtaining an area of an internal region of the polygon occupied within a predetermined unit (i.e. pixel) to be drawn corresponding to the drawing point where the polygon edge intersects with the scanning line, in a case where the polygon edge is a "left" edge. In this example, the upper left corner (integer value) of a pixel having a width of X-coordinate value 1 and a height of Y-coordinate value 1 (corresponding to one picture element) is used as a drawing point. However, any of the four corners of the pixel having a square shape can be used as the drawing point.

The YX divider 12 calculates a ratio IdL of increment of the value in the Y-axis direction to increment of the value in the X-axis direction along a direction from the starting vertex of the polygon edge to the ending vertex of the polygon edge, based on the absolute value d_left of the difference value of the X-axis direction output from the X-axis direction difference computing unit 3 and the difference value dy_left of the Y-axis direction output from the Y-axis direction difference computing unit 4. The ratio IdL is always a positive value, since the starting vertex and the ending vertex are defined as shown in FIG. 2.

The area ratio initial value calculating circuit 13 calculates an intermediate variable aL from the ratio IdL output from the YX divider 12 and intersection point data sL', eL', sL and eL generated by the intersection point X-coordinate calculating circuit 11, according to the determination results based on the sign dx_left[m] output from the X-axis direction difference value computing unit 3 and the identification signal output from the comparator 9, and calculates an area ratio a_left of an internal region of the polygon occupied within a pixel at each of the intersection starting drawing point and the intersection ending drawing point based on the intermediate variable aL.

Figure 11:
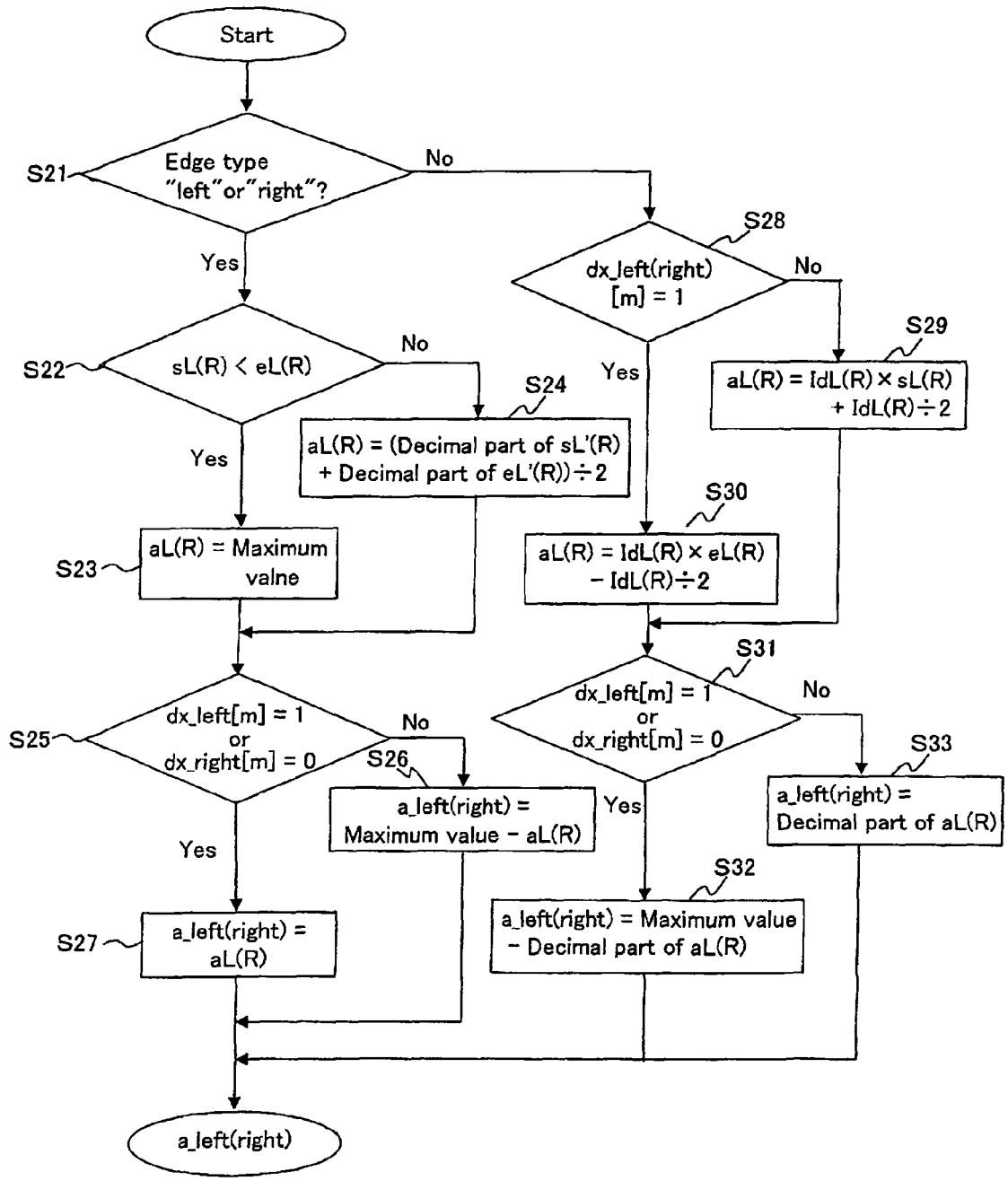
FIG. 11 is a flowchart showing an operation of the area ratio initial value calculating circuit shown in FIG. 1.

Next, an algorithm for calculating the area ratio will be described in detail below with reference to FIG. 11.

In step S21, it is determined whether or not the edge type is "left" or "right". For example, when the inclination of the polygon edge is larger than 1, it is determined that the edge type is "left" or "right" ("Yes" in step S21). In this case, the process proceeds to step S22.

In step S22, it is determined whether or not a relationship of sL<eL is satisfied (i.e. whether or not the polygon edge traverses two or more pixels between the current scanning line and the next scanning line).

If "Yes" in step S22, then the intermediate variable aL is set to a maximum value in step S23. Herein, the maximum value is defined as a value of aL corresponding to the area ratio of 100% (which indicates a state where the pixel is completely included in the internal region of the polygon). This is equivalent to the maximum value for significant digits of the decimal part, such as sL'.

If "No" in step S22, then the intermediate variable aL is set to an average value of the decimal part of sL' and the decimal part of eL' in step S24. In this case, the intermediate variable aL represents a distance from an edge of the pixel on the side of the starting vertex to the polygon edge along the Y-center of the pixel, like an example of the case where the edge type is "left" as shown in portion (a) of FIG. 10.

In step S25, it is determined whether or not dx_left[m]=1 or dx_right[m]=0 is satisfied (i.e. whether or not a particular relationship between the X-coordinate of the starting vertex and the X-coordinate of the ending vertex is satisfied).

If "No" in step S25, then the area ratio a_left is obtained by subtracting the intermediate variable aL from the maximum value in step S26. If "Yes" in step S25, then the area ratio a_left is set to the intermediate variable aL in step S27. Thus, according to the determination result in step S25, one of the steps S26 and S27 are selected and the selected step is performed in order to obtain the area ratio a_left of an internal region of the polygon within the pixel corresponding to the value sxL. This selection is made to calculate the area ratio in any cases using a distance from an edge of the pixel on the side of the internal region of the polygon to the polygon edge.

Thus, when the inclination of the polygon edge is larger than 1, it is possible to simplify the calculation without degrading its precision, by changing a calculation method in accordance with whether or not the polygon edge traverses two or more pixels between the current scanning line and the next scanning line.

Next, when the inclination of the polygon edge is smaller than or equal to 1, it is determined that the edge type is neither "left" nor "right" ("No" in step S21). In this case, the process proceeds to step S28.

In step S28, it is determined whether or not a relationship of dx_left[m]=1 is satisfied (i.e. whether or not the sign dx_left[m] output from the X-axis direction difference computing unit 3 is equal to 1).

If "No" in step S28, then the intermediate variable aL is obtained by adding IdL/2 (which indicates a distance in the Y-axis direction from the drawing point sxL to the X-center of the pixel) to IdL X eL (which indicates a distance in the Y-axis direction from the starting vertex to the drawing point sxL) in step S29.

If "Yes" in step S28, then the intermediate variable aL is obtained by subtracting IdL/2 (which indicates a distance in the Y-axis direction from the drawing point sxL to the X-center of the pixel) from IdL X eL (which indicates a distance in the Y-axis direction from the starting vertex to the drawing point sxL) in step S30.

The decimal part of the intermediate variable aL represents a distance from an edge of the pixel on the side of the starting vertex to the polygon edge along the X-center of the pixel, like an example of the case where the edge type is "upper" as shown in portion (b) of FIG. 10.

Figure 5:
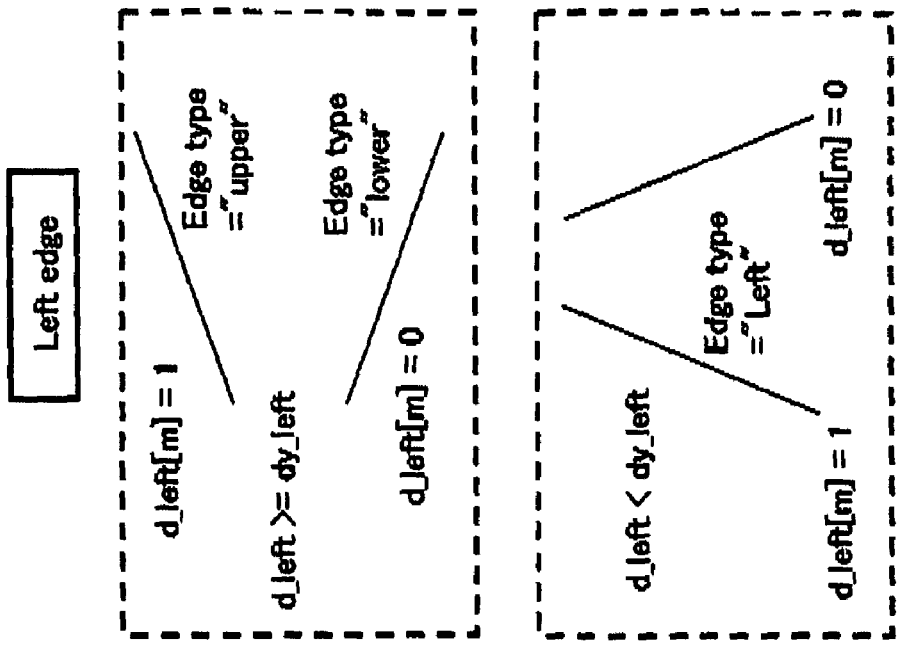
FIG. 5 is a diagram showing a method for categorizing the polygon edge when the polygon edge is a right edge.

In a similar manner as the case where the edge type is "left" or "right" as described above, in steps S31 to S33, the area ratio a_left of an internal region of the polygon within the pixel corresponding to the sxL is calculated using a distance from an edge of the pixel on the side of the internal region of the polygon to the polygon edge, regardless of the relationship between the X-coordinate of the starting vertex and the X-coordinate of the ending vertex. As a result, when the edge type is "upper" as shown in FIG. 4 and FIG. 5, the area ratio is calculated using a distance from the lower edge of the pixel to the polygon edge, and when the edge type is "lower" as shown in FIG. 4 and FIG. 5, the area ratio is calculated using a distance from the upper edge of the pixel to the polygon edge.

In this manner, it is possible to calculate a value of the area ratio a_left of an internal region of the polygon within the pixel corresponding to the intersection starting drawing point having the X-coordinate sxL, among the drawing points corresponding to the intersection points between the polygon edge and the scanning lines. Further, in the case where the edge type is "upper" or "lower", it is necessary to calculate an area ratio for each of the drawing points corresponding to the remaining intersection points, i.e. each of the drawing points having the X-coordinates of sxL+1 to exL.

It is assumed that a pixel of interest is one of the drawing points having the X-coordinates of sxL+1 to exL. In this case, the area ratio for the pixel of interest is calculated by adding increment IdL in the Y-axis direction per +1 increment in the X-axis direction to the area ratio calculated for a pixel adjacent to the pixel of interest, wherein the pixel is located on the left side of the pixel of interest, like an example in the case where the edge type is "upper" as shown in portion (b) of FIG. 10. When the edge type is "upper" or "lower", the area ratio is calculated using a distance along the Y-axis direction. Accordingly, the area ratio can be calculated sequentially by adding IdL to the area ratio for the adjacent pixel. This calculation process is performed in the selective adding circuit 15 shown in FIG. 1, by using the X-coordinate of the drawing point indicated by the X-counter 14 shown in FIG. 1.

In this manner, it is possible to calculate the area ratio of an internal region of the polygon within the pixel, for all of the drawing points corresponding to the intersection points between the polygon edge and the scanning lines.

As described above, according to the three dimensional graphics processing apparatus 1 of the present embodiment, an optimal calculating method can be selected in accordance with the inclination of each polygon edge, which is categorized into a left edge or a right edge, included in a polygon and a relationship between the X-coordinate of the starting vertex and the X-coordinate of the ending vertex for each polygon edge. This makes it possible to realize the calculation of the coordinates of the drawing points corresponding to the intersection points between the polygon edge and the scanning lines, while the reduction of the precision of the calculation is restricted as much as possible without increasing the required hardware resources.

Further, it is possible to simultaneously calculate an area ratio of an internal region of the polygon occupied within a pixel, which is required for anti-aliasing process. In this case, it is possible to restrict the increase of the calculation time by selecting an optimal calculation method in accordance with the respective cases.

In the present embodiment described above, the three dimensional graphics processing apparatus 1 is implemented by hardware. However, the present invention is not limited to such a hardware implementation. Alternatively, the three dimensional graphics processing apparatus 1 can be implemented by software.

For example, the three dimensional graphics processing apparatus 1 can be implemented by executing a control program representing a three dimensional graphics processing method. The control program is executed, for example, by a computer or a CPU (Central Processing Unit) as a control section. The control program can be recorded on a computer-readable recording medium such as an optical disc (CD), a hard disc and a magnetic disc (FD). Alternatively, the control program can be stored in a ROM (storage section) in a computer. The control program is read from the ROM to a RAM as a work memory in the computer. The control program in the RAM can be executed with reference to the various data.

The three dimensional graphics processing method may include the steps of:

subtracting a value of the X-coordinate of the starting vertex from a value of the X-coordinate of the ending vertex so as to obtain a difference value of the X-coordinates, for each polygon edge which is categorized into a left edge or a right edge;

subtracting a value of the Y-coordinate of the starting vertex from a value of the Y-coordinate of the ending vertex so as to obtain a difference value of the Y-coordinates, for each polygon edge which is categorized into a left edge or a right edge;

dividing the absolute value of the difference value of the X-coordinates by the difference value of the Y-coordinates so as to obtain a ratio of increment of the polygon edge in the X-axis direction to increment of the polygon edge in the Y-axis direction;

multiplying the ratio of increment of the polygon edge in the X-axis direction to increment of the polygon edge in the Y-axis direction by the number of the scanning lines from the starting vertex to the current scanning line so as to obtain a distance in the X-axis direction from the starting vertex to the current scanning line;

determining a relationship between the absolute value of the difference value of the X-coordinates and the difference value of the Y-coordinates (i.e. an inclination of the polygon edge);

determining whether or not 0.5 is added to a distance in the X-axis direction from the starting vertex to an intersection point between the polygon edge and the current scanning line in accordance with the inclination of the polygon edge, truncating the decimal part of the resultant value so as to obtain an integer distance in the X-axis direction, and apply a similar processing to the next scanning line;

selectively calculating a value of the X-coordinate from the drawing point having the smallest X-coordinate and the drawing point having the largest X-coordinate, among the drawing points corresponding to the respective intersection points between the polygon edge and the current and next scanning lines, by using the integer distance in the X-axis direction obtained in the above step in accordance with the inclination of the polygon edge;

dividing the difference value of the Y-coordinates by the absolute value of the difference value of the X-coordinates so as to obtain a ratio of increment of the polygon edge in the Y-axis direction to increment of the polygon edge in the X-axis direction; and determining which side of the right, left, upper and lower sides of the pixel is used to calculate the area ratio in accordance with the inclination of the polygon edge and the sign of the difference value of the X-coordinates, and calculating the area ratio based on a distance from the determined side of the pixel to the polygon edge, when the area ratio is calculated based on each of the X-coordinates of the drawing points and the ratio obtained in the dividing step, wherein, in calculating the area ratio, when the inclination of the polygon edge is larger than 1, if the polygon edge traverses a pixel boundary between the current scanning line and the next scanning line, then a constant area ratio is used, otherwise the area ratio is obtained by calculation.

According to the three dimensional graphics processing method described above, it is possible to provide an advantageous effect of performing an anti-aliasing processing in an efficient manner, without using the conventional area DDA and any frame buffer required for the area DDA. This is achieved by using a line buffer as an area for storing display image data to reduce the required memory area, while the increase of the calculation time is restricted by performing calculation suitable for the polygon edge without degrading the precision of the calculation.

It is possible to use the three dimensional graphics processing apparatus of the present invention described above in an image display apparatus capable of displaying computer graphics, such as three dimensional gaming devices.

As described above, the present invention is exemplified by the use of the preferred embodiments of the present invention. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

The present invention is useful for providing a three dimensional graphics processing apparatus capable of efficiently using a limited number of computing unit and performing a highly consistent polygon edge drawing process and an anti-aliasing process at a higher speed without degrading the precision of the calculation, which can be used in a display unit for a gaming device capable of displaying computer graphics (CG). The present invention is also useful for providing an image display apparatus including the three dimensional graphics processing apparatus, a three dimensional graphics processing method using the three dimensional graphics processing apparatus, a control program for making a computer execute the steps of the three dimensional graphics processing method, and a computer-readable recording medium on which the control program is recorded, for example.

In the technical field described above, when the coordinates of the intersection points between the polygon edge and the scanning lines are calculated based on only information on the starting vertex and the ending vertex of the polygon edge and information on the scanning lines, a calculation method most suitable for each case is applied in accordance with the inclination of the polygon edge and a relationship between the X-coordinate of the starting vertex and the X-coordinate of the ending vertex. According to this, it is possible to specify the drawing points at a higher speed and with a higher precision. Further, it is possible to use a drawing method using very small memory areas such as a line buffer, since the processing of the drawing point does not depend on any information on the drawing points located above and/or below. Furthermore, even when a polygon edge is shared by two polygons, a border of the two polygons can be uniquely determined. Furthermore, in addition to categorizing each polygon edge in a similar manner when the area ratio of an internal region of the polygon occupied within a pixel for each drawing point is calculated, by changing a calculation method in accordance with a relationship between the polygon edge and the pixel boundary, it is possible to determine the area ratio at a higher speed and without degrading precision and to utilize a line buffer in the anti-aliasing process. As a result, it is possible to perform an anti-aliasing processing without requiring a large amount of memory regions or processing time as is the case for conventional techniques.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A three dimensional graphics processing apparatus comprising:
    a polygon edge categorizing section for categorizing each polygon edge included in at least one three dimensional polygon of a three dimensional graphics image as being at least a left edge or a right edge in accordance with an inclination of the polygon edge being categorized in a two dimensional XY-coordinate plane;
    a coordinate calculating section for calculating coordinates of a drawing point having the smallest X-coordinate and coordinates of a drawing point having the largest X-coordinate from among drawing points corresponding to a first intersection point between the polygon edge being categorized and a first one of adjacent scanning lines and a second intersection point between the polygon edge being categorized and a second one of the adjacent scanning lines; and
    an area ratio calculating section for calculating an area ratio of an internal region of the polygon occupied within a pixel of a predetermined unit region corresponding to each of the first and second intersection points, with the area ratio calculated by the area ratio calculating section being based on the respective coordinates of the drawing points calculated by the coordinate calculating section;
    wherein each categorized polygon edge has a starting vertex and an ending vertex, and the coordinate calculating section includes:
    an X-axis direction distance obtaining section for determining which of (i) rounding-off of a distance in the X-axis direction from the starting vertex of the categorized polygon edge to the intersection point between the categorized polygon edge and a scanning line by adding 0.5 to the distance and truncating a resultant decimal part and (ii) rounding-down of the distance in the X-axis direction from the starting vertex of the categorized polygon edge to the intersection point between the categorized polygon edge and the scanning line by truncating the decimal part of the distance based on the inclination of the categorized polygon edge, wherein rounding-off is performed when the inclination is smaller than or equal to 1 and rounding-down is performed when the inclination is larger than 1, so as to obtain an integer distance in the X-axis direction from the starting vertex of the categorized polygon edge to the intersection point between the categorized polygon edge and a current or a next scanning line.

2. A three dimensional graphics processing apparatus according to claim 1, wherein the polygon edge categorizing section includes:
    an X-axis direction difference computing section for subtracting a value of the X-coordinate of one of the starting vertex and the ending vertex of the polygon edge being categorized from a value of the X-coordinate of the other of the starting vertex and the ending vertex of the polygon edge being categorized so as to obtain a difference value of the X-coordinates;
    a Y-axis direction difference computing section for subtracting a value of the Y-coordinate of one of the starting vertex and the ending vertex of the polygon edge being categorized from a value of the Y-coordinate of the other of the starting vertex and the ending vertex of the polygon edge being categorized so as to obtain a difference value of the Y-coordinates; and
    a comparison/determination section for comparing the difference value of the X-coordinates with the difference value of the Y-coordinates and determining the inclination of the polygon edge being categorized based on the comparison result, and categorizing the polygon edge being categorized in accordance with the inclination determined by the comparison/determination section.

3. A three dimensional graphics processing apparatus according to claim 2, wherein the comparison/determination section categorizes the polygon edge being categorized such that when the inclination of the polygon edge being categorized is smaller than or equal to 1, the polygon edge being categorized is categorized as being "upper" when the polygon edge being categorized is a left edge and the difference value of the X-coordinates is a negative value, the polygon edge being categorized is categorized as being "lower" when the polygon edge being categorized is a right edge and the difference value of the X-coordinates is a negative value, the polygon edge being categorized is categorized as being "lower" when the polygon edge being categorized is a left edge and the difference value of the X-coordinates is a positive value, and the polygon edge being categorized is categorized as being "upper" when the polygon edge being categorized is a right edge and the difference value of the X-coordinates is a positive value.

4. A three dimensional graphics processing apparatus according to claim 2, wherein the comparison/determination section categorizes the polygon edge being categorized such that when the inclination of the polygon edge being categorized is larger than 1, the polygon edge being categorized is categorized as being "left" when the polygon edge being categorized is a left edge and the polygon edge being categorized is categorized as being "right" when the polygon edge being categorized is a right edge.

5. A three dimensional graphics processing apparatus according to claim 1, wherein the X-axis direction distance obtaining section includes:
  an X-axis direction difference computing section for subtracting a value of the X-coordinate of one of the starting vertex and the ending vertex of the categorized polygon edge from a value of the X-coordinate of the other of the starting vertex and the ending vertex of the categorized polygon edge so as to obtain a difference value of the X-coordinates;
  a Y-axis direction difference computing section for subtracting a value of the Y-coordinate of one of the starting vertex and the ending vertex of the categorized polygon edge from a value of the Y-coordinate of the other of the starting vertex and the ending vertex of the categorized polygon edge so as to obtain a difference value of the Y-coordinates;
  an XY dividing section for dividing the difference value of the X-coordinates by the difference value of the Y-coordinates so as to obtain a ratio of increment of the characterized polygon edge in the X-axis direction to increment of the categorized polygon edge in the Y-axis direction;
  a scanning line incremental value calculating section for calculating the number of the scanning lines scanned from the starting vertex of the categorized polygon edge to the current scanning line;
  a multiplying section fox multiplying the ratio obtained by the XY dividing section by the number of the scanning lines calculated by the scanning line incremental value calculating section so as to obtain a distance in the X-axis direction from the starting vertex of the categorized polygon edge to the current scanning line; and
  a rounding-off section for determining whether or not 0.5 is added to the distance in the X-axis direction obtained by the multiplying section based on the inclination of the categorized polygon edge, and truncating the resultant decimal part so as to obtain the integer distance in the X-axis direction.

6. A three dimensional graphics processing apparatus according to claim 1, wherein the coordinate calculating section includes:
  an intersection point X-coordinate calculating section for calculating a value of the X-coordinate from the drawing point having the smallest X-coordinate and the drawing point having the largest X-coordinate, from among the drawing points corresponding to the respective intersection points between the categorized polygon edge and the adjacent scanning lines, based on the inclination of the categorized polygon edge, the integer distance in the X-axis direction, and the value of the X-coordinate of the starting vertex of the categorized polygon edge.

7. A three dimensional graphics processing apparatus according to claim 1, wherein the area ratio calculating section determines which side of right, left, upper and lower sides of the pixel is used to calculate the area ratio based on information on the categorized polygon edge, the X-coordinate of the drawing point having the smallest X-coordinate, and the X-coordinate of the drawing point having the largest X-coordinate, and calculates the area ratio from the determined side of the pixel.

8. A three dimensional graphics processing apparatus according to claim 7, wherein the area ratio calculating section includes:
  a calculation method determining section for determining a calculation method by determining whether or not the categorized polygon edge which is categorized as being "left" or "right" traverses at least two pixels from the time when the categorized polygon edge intersects with the current scanning line to the time when the categorized polygon edge intersects with the next scanning line when the inclination of the categorized polygon edge is larger than 1.

9. An image display apparatus including the three dimensional graphics processing apparatus according to claim 1 and a screen that displays the three dimensional graphics image.

10. A three dimensional graphics processing method being performed by a three dimensional processing apparatus, the method comprising the steps of:
  (a) a polygon edge categorizing section of the three dimensional processing apparatus categorizing each polygon edge included in at least one three dimensional polygon of a three dimensional graphics image as being at least a left edge or a right edge in accordance with an inclination of the polygon edge being categorized in a two dimensional XY-coordinate plane;
  (b) a coordinate calculating section of the three dimensional processing apparatus calculating coordinates of a drawing point having the smallest X-coordinate and coordinates of a drawing point having the largest X-coordinate from among drawing points corresponding to a first intersection point between the polygon edge being categorized in step (a) and a first one of adjacent scanning lines and a second intersection point between the polygon edge being categorized in step (a) and a second one of the adjacent scanning lines; and
  (c) an area ratio calculating section of the three dimensional processing apparatus calculating an area ratio of an internal region of the polygon occupied within a pixel of a predetermined unit region corresponding to each of the intersection points, with the area ratio being based on the respective coordinates of the drawing points calculated in the step (b);
  wherein each categorized polygon edge has a starting vertex and an ending vertex, and the step (b) includes the steps of:
  (d) determining which of (i) rounding-off of a distance in the X-axis direction from the starting vertex of the categorized polygon edge to the intersection point between the categorized polygon edge and a scanning line by adding 0.5 to the distance and truncating the resultant decimal part and (ii) rounding-down of the distance in the X-axis direction from the starting vertex of the categorized polygon edge to the intersection point between the categorized polygon edge and the scanning line by truncating the decimal part of the distance should be performed based on the inclination of the categorized polygon edge wherein rounding-off is performed when the inclination is smaller than or equal to 1 and rounding-down is performed when the inclination is larger than 1, so as to obtain an integer distance in the X-axis direction from the starting vertex of the categorized polygon edge to the intersection point between the polygon edge and a current or a next scanning line.

11. A three dimensional graphics processing method according to claim 10, wherein the step (a) includes the steps of:
  subtracting a value of the X-coordinate of one of the starting vertex and the ending vertex of the polygon edge being categorized from a value of the X-coordinate of the other of the starting vertex and the ending vertex of the polygon edge being categorized so as to obtain a difference value of the X-coordinates;
  subtracting a value of the Y-coordinate of one of the starting vertex and the ending vertex of the polygon edge being categorized from a value of the Y-coordinate of the other of the starting vertex and the ending vertex of the polygon edge being categorized so as to obtain a difference value of the Y-coordinates; and
  comparing the difference value of the X-coordinates with the difference value of the Y-coordinates and determining the inclination of the polygon edge being categorized based on the comparison result, and categorizing the polygon edge being categorized in accordance with the inclination determined by the determining the inclination step.

12. A three dimensional graphics processing method according to claim 10, wherein the step (b) further includes the step of:
  (e) calculating a value of the X-coordinate from the drawing point having the smallest X-coordinate and the drawing point having the largest X-coordinate from among the drawing points corresponding to the respective intersection points between the categorized polygon edge and the adjacent scanning lines, based on the inclination of the polygon edge, the integer distance in the X-axis direction, and the value of the X-coordinate of the starting vertex of the categorized polygon edge.

13. A three dimensional graphics processing method according to claim 12, wherein the step (d) includes the steps of:
  subtracting a value of the X-coordinate of one of the starting vertex and the ending vertex of the categorized polygon edge from a value of the X-coordinate of the other of the starting vertex and the ending vertex of the categorized polygon edge so as to obtain a difference value of the X-coordinates;
  subtracting a value of the Y-coordinate of one of the starting vertex and the ending vertex of the categorized polygon edge from a value of the Y-coordinate of the other of the starting vertex and the ending vertex of the categorized polygon edge so as to obtain a difference value of the Y-coordinates;
  dividing the difference value of the X-coordinates by the difference value of the Y-coordinates so as to obtain a ratio of increment of the categorized polygon edge in the X-axis direction to increment of the categorized polygon edge in the Y-axis direction;
  calculating the number of the scanning lines scanned from the starting vertex of the categorized polygon edge to the current scanning line;
  multiplying the ratio obtained in the dividing step by the number of the scanning lines so as to obtain a distance in the X-axis direction from the starting vertex of the categorized polygon edge to the current scanning line; and
  determining whether or not 0.5 is added to the distance in the X-axis direction obtained in the multiplying step based on the inclination of the categorized polygon edge, and truncating the resultant decimal part so as to obtain the integer distance in the X-axis direction.

14. A three dimensional graphics processing method according to claim 10, wherein the categorized polygon edge having a starting vertex and the ending vertex is produced by step (a) and the step (c) includes the steps of:
  subtracting a value of the X-coordinate of one of the starting vertex and the ending vertex of the categorized polygon edge from a value of the X-coordinate of the other of the starting vertex and the ending vertex of the categorized polygon edge so as to obtain a difference value of the X-coordinates;
  subtracting a value of the Y-coordinate of one of the starting vertex and the ending vertex of the categorized polygon edge from a value of the Y-coordinate of the other of the starting vertex and the ending vertex of the categorized polygon edge so as to obtain a difference value of the Y-coordinates;
  dividing the difference value of the Y-coordinates by the difference value of the X-coordinates so as to obtain a ratio of increment of the categorized polygon edge in the Y-axis direction to increment of the categorized polygon edge in the X-axis direction;
  determining which side of right, left, upper and lower sides of the pixel is used to calculate the area ratio in accordance with the inclination of the categorized polygon edge and the sign of the difference value of the X-coordinates, and calculating the area ratio based on a distance from the determined side of the pixel to the categorized polygon edge when the area ratio is calculated based on the respective coordinates calculated in the step (b) and the ratio obtained in the dividing step.

15. A three dimensional graphics processing method according to claim 14, wherein in the calculating the area ratio, when the inclination of the categorized polygon edge is larger than 1, if the categorized polygon edge traverses a pixel boundary between the current scanning line and the next scanning line, then a constant area ratio is used, otherwise the area ratio is obtained by calculation.

16. A non-transitory computer-readable recording medium having stored thereon a computer executable program for three dimensional graphics processing, the computer executable program when executed causes the computer to implement the steps of:
  (a) categorizing each polygon edge included in at least one three dimensional polygon of a three dimensional graphics image as being at least a left edge or a right edge in accordance with an inclination of the polygon edge being categorized in a two dimensional XY-coordinate plane;
  (b) calculating coordinates of a drawing point having the smallest X-coordinate and coordinates of a drawing point having the largest X-coordinate from among drawing points corresponding to a first intersection point between the polygon edge being categorized in step (a) and a first one of adjacent scanning lines and a second intersection point between the polygon edge being categorized in step (a) and a second one of the adjacent scanning lines; and (c) calculating an area ratio of an internal region of the polygon occupied within a pixel of a predetermined unit region corresponding to each of the intersection points, with the area ratio being based on the respective coordinates of the drawing points calculated in the step (b);

wherein each categorized polygon edge has a starting vertex and an ending vertex, and the step (b) includes the steps of:

(d) determining which of (i) rounding-off of a distance in the X-axis direction from the starting vertex of the categorized polygon edge to the intersection point between the categorized polygon edge and a scanning line by adding 0.5 to the distance and truncating the resultant decimal part and (ii) rounding-down of the distance in the X-axis direction from the starting vertex of the categorized polygon edge to the intersection point between the categorized polygon edge and the scanning line by truncating the decimal part of the distance should be performed based on the inclination of the categorized polygon edge, wherein rounding-off is performed when the inclination is smaller than or equal to 1 and rounding-down is performed when the inclination is larger than 1, so as to obtain an integer distance in the X-axis direction from the starting vertex of the categorized polygon edge to the intersection point between the polygon edge and a current or a next scanning line.

* * * * *